(12) United States Patent
de Goycoechea

(10) Patent No.: US 11,277,173 B2
(45) Date of Patent: Mar. 15, 2022

(54) RADIO DISTRIBUTION SYSTEM

(71) Applicant: Ricardo Matias de Goycoechea, Cordoba (AR)

(72) Inventor: Ricardo Matias de Goycoechea, Cordoba (AR)

( * ) Notice: Subject to any disclaimer, the term of this patent is extended or adjusted under 35 U.S.C. 154(b) by 0 days.

(21) Appl. No.: 17/071,462

(22) Filed: Oct. 15, 2020

(65) Prior Publication Data

US 2021/0111763 A1 Apr. 15, 2021

Related U.S. Application Data

(60) Provisional application No. 62/915,154, filed on Oct. 15, 2019.

(51) Int. Cl.
*H04B 7/02* (2018.01)
*H04L 1/02* (2006.01)
*H04B 7/026* (2017.01)
*H04W 4/33* (2018.01)

(52) U.S. Cl.
CPC ............. *H04B 7/026* (2013.01); *H04W 4/33* (2018.02)

(58) Field of Classification Search
CPC ........ G01S 7/4815; G01S 17/10; G01S 17/42; G01S 7/484; G01S 17/06; G01S 17/89

USPC .......................................................... 375/267
See application file for complete search history.

(56) References Cited

U.S. PATENT DOCUMENTS

| | | | | |
|---|---|---|---|---|
| 8,611,454 | B2 * | 12/2013 | Tong | H04W 72/06 375/267 |
| 2006/0046754 | A1 * | 3/2006 | Parikh | H04B 7/2606 455/517 |
| 2014/0146692 | A1 * | 5/2014 | Hazani | H04L 43/00 370/252 |
| 2018/0083917 | A1 * | 3/2018 | Xu | H04L 61/2038 |
| 2020/0344715 | A1 * | 10/2020 | Radian | H04W 64/006 |

* cited by examiner

*Primary Examiner* — Tanmay K Shah
(74) *Attorney, Agent, or Firm* — Rafael Perez-Pineiro; The Brickell IP Group, PLLC

(57) ABSTRACT

A distributed antenna system for providing extended signal coverage within an indoor area is disclosed. In the system, a master unit receives a first modulated signal from an outdoor base transceiver station, and relays the modulated signal to a remote unit through a distribution network. The master unit also receives a base band signal originating outside the indoor area, and transmits the baseband signal to a micro base transceiver station through the distribution network. The micro base transceiver station modulates the base band signal and transmits the modulated base band signal to a terminal unit through an indoor antenna.

8 Claims, 6 Drawing Sheets

RADIO DISTRIBUTION SYSTEM

CROSS REFERENCE TO RELATED APPLICATIONS

This application claims the benefit of U.S. Provisional Application No. 62/915,154 filed Oct. 15, 2019, the disclosure of which is hereby incorporated herein by reference in its entirety.

FIELD OF THE INVENTION

Embodiments of the present invention generally relate to a system and method for detecting the location of Public Safety Agents carrying a radio within an indoor coverage area and for generating Public Safety signals locally within the indoor coverage area instead of amplifying signals from an outdoor base station.

BACKGROUND

One of the operational backbones of Public Safety Agencies is their communications systems. Those communication systems enable the Public Safety Agencies to exchange information in real time, coordinate tasks of different operating groups, allow the agencies to attend to and deal with emergency situations, coordinate their personnel locally or remotely, and collaborate in orderly fashion with other Public Safety Agencies. Within the communications field, telecommunications in particular facilitate the provision of services that allow the aforementioned objectives to be met, since, through electromagnetic waves, information is sent from one point to another, either as an audio message or digital data.

Telecommunications systems are designed or planned according to the geographical area they must cover, starting with Base Stations, which communicate with Terminal Equipment (e.g., fixed, mobile or portable radios) that may be used by Public Safety Agents. The benefits provided by the telecommunication system to Public Safety forces depends on the technology used to implement the telecommunications system. From the most basic systems based on frequency modulation (analog), to more advanced systems that employ digital modulation such as P25 Phase 2 or TETRA, all systems aim to provide information and operational coordination, with the goal of having Public Safety Agents perform their duties and functions in a more effective and safer manner.

The advantages of one particular system or technology over another wear thin when physical structures become barriers that impact communication. Electromagnetic waves, which form the basis for the wireless transmission of information in any telecommunications system, propagate through the air at speeds close to the speed of light, but as they propagate, they are attenuated, that is, they lose strength.

The quality of the information received by a wireless receiver depends largely on the strength of the electromagnetic wave, or also called "radio signal." The more the radio signal propagates or travels through the air, the more the signal is attenuated which can result in the loss of high quality communication of information. Air is not the only medium of propagation that produces loss of information quality due to the attenuation of the strength of the radio signals. Any other physical barrier interposed between a transmitter and a receiver will have to be penetrated by the radio signal to reach its intended recipient, and when the radio signal propagates through that physical barrier, the physical barrier will impact the amplitude of the radio signal, resulting in attenuation. The attenuation caused by physical structures is always a problem that must be addressed by the designer of the telecommunication system, and there is no practical way to avoid it. Exemplary physical barriers include walls, ceilings, or any other physical structure through which the radio signal must propagate while travelling along its path from the Base Station to the Terminal Equipment, and vice versa. From the foregoing, it can be argued that one of the most important problems that the Public Safety Agencies must face in the use of their telecommunications systems relates to how they can make these systems work properly in closed spaces. Whether it's an active shooting, a police chase, a fire or a rescue, any of these situations can occur (and occur) in closed places such as commercial buildings, shopping malls, schools, subway stations, stadiums, etc. and that's where there is a need for telecommunications systems to be most reliable and serve as the connection tool needed by Public Safety Agents.

Another problem that Public Safety Agents must face when they enter enclosed spaces is that they may suffer an accident or have some inconvenience while carrying out their duties or functions, and in many circumstances their own lives might be at risk. If a Public Safety Agent, in an emergency, cannot leave the enclosed space on their own, either because they are trapped, injured or unconscious, other agents should be able to quickly locate that Public Safety Agent to conduct a rescue mission.

The radio systems used by Public Safety Agencies are equipped with functionality that allows transmission of emergency/distress signals in case of emergencies. If that emergency/distress signal is generated by a Public Safety Agent in an open place, radio systems can capture that signal from various base stations, and using triangulation algorithms, can detect quite accurately the location of the Public Safety Agent that is requesting assistance. Other systems may transmit through radio signals, the GPS coordinates of the radio of the Public Safety Agent in distress, this being a more direct and precise means of location.

However, these methods do not accurately work to detect location when the Public Safety Agents are seeking help in an indoor area. Generally, in enclosed places there is no good penetration of the satellite signals of the GPS system, which is why any GPS-based positioning method does not work properly for enclosed spaces. On the other hand, due to the great attenuation that radio signals suffer when propagating through walls, it is very difficult that the emergency signal emitted by Terminal Equipment carried by the Public Safety Agent can be picked up by the base stations to perform triangulation, and even if triangulation could be used to calculate a location, at best the base stations might indicate approximately from what building or enclosed space the distress signal has been emitted. However, an emergency situation demands knowing the specific location inside the building from which the distress signal has been emitted, since in the event of an emergency situation it is imperative to quickly determine the location of the "man down" instead of attempting a rescue mission that involves having a team go through each and every room in a building to locate the person under distress and/or in need of help.

There are several existing solutions in the market that attempt to solve signal coverage problems of the Public Safety Agencies telecommunications systems. Most of these solutions are based on installing systems that receive signals from the Base Stations, amplify them, and retransmit them throughout the interior of a building. These solutions are based on the use of a Signal Booster that bi-directionally amplifies the signals of the Base Station to the Terminal Equipment, and vice versa. In the downlink direction, signals from the Base Station are received by a donor antenna that points to the Base Station, and after being amplified, the signals are distributed throughout the interior of the enclosed environment (indoor environment) through a passive radio frequency distribution network and indoor antennas. In the opposite direction (uplink), the signals transmitted by the Terminal Equipment carried by Public Safety Agents are captured by the indoor antennas, reach the Signal Booster through the passive radio frequency distribution network, and then are amplified and radiated to the Base Station by means of the donor antenna.

When the indoor area subject to coverage is very large, then instead of using a Signal Booster, a system using multiple amplifier elements known in the industry as Distributed Antenna System, or Fiber DAS, may be used. These systems have an operation that is similar to that of a Signal Booster but which can cover larger areas through use of more antennas.

There are other options that may be classified as hybrids between a Signal Booster and a Fiber DAS, but they all aim to achieve the same result, amplifying the radio signals of the Public Safety Agencies' telecommunications system so that their agents have sufficient radio coverage to be able to perform their duties or functions in those closed places.

All of these current solutions have many drawbacks in their application and how they impact the base stations of radio systems. Usually a signal booster or a Fiber DAS system includes high gain amplifiers that amplify signals in the same frequency (without any upconversion or downconversion), so the problems they present usually include raising of the noise floor in the uplink band, which is the band of Terminal Equipment communication to the Base Station. This elevation of the noise floor takes away from the Base Station the ability to listen to the radio signals emitted by the Terminal Equipment that are in the border of the coverage area of the network itself, causing a "slight deafness" effect, which drastically reduces the size to the operational area of the Base Station. Another problem related to that type of solution (i.e., use of high gain amplifiers) is that it can amplify harmonics to create oscillation, becoming a source of noise or interference generation that ends up blocking the uplink receivers of the Base Station. The systems based on Signal Booster and Fiber DAS, as mentioned before, are high gain amplifiers that are operating on the same frequency (the same frequency that enters is the same frequency that comes out) so that their operation depends on how well the antennas are isolated (i.e., input or indoor antenna and output or service antenna), because, if for some reason the isolation between those antennas is equal to or less than the gain of the Signal Booster or Fiber DAS, then the system begins to oscillate, becoming a source of interference, while at the same time ceasing to provide the indoor coverage extension service for which it was installed. Although there are protection mechanisms to avoid raising the floor of noise in uplink as well as to enter oscillation, these mechanisms limit the functionality of the application and against a failure, turn off the system to protect the Base Radio (which is very important), leaving without coverage service the indoor environment (which is also very critical).

Another problem with prior systems is that none of these systems is able to provide a solution to the problem of positioning. All these prior systems are based on a network of indoor antennas that are the ones that capture the signals of the Terminal Equipment that are being carried or used by Public Safety Agents, but once the signals are captured by the indoor antennas there is no way of knowing which antenna captured it, and thus the location of the Terminal Equipment remains unknown.

Other solutions in the market are based on auxiliary positioning elements such as beacons or RFID systems, which serve as external reference systems that can indirectly detect the position of the Terminal Equipment or the public security agent that carries a tag RFID or having a reading device of the beacons, but in either case the positioning is based on another system to be mounted in parallel and requires adjustments and maintenance, which requires an additional investment with respect to both the installation and for the operation of the system, rendering them as inefficient solutions.

Therefore, in view of these disadvantages, there is a need in the art for an improved system and method to detect and report the location of terminal units within an indoor coverage area and to generate public safety signals within the indoor coverage area.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

The present disclosure relates to a system and method for determining the position of terminal units within an indoor coverage area and for generating public safety signals within the coverage area. A distributed antenna system for providing extended signal coverage within an indoor area is disclosed. In one implementation of the system, a master unit receives a first modulated signal from an outdoor base transceiver station, and relays the modulated signal to a remote unit through a distribution network. The master unit also receives a base band signal originating outside the indoor area, and transmits the baseband signal to a micro base transceiver station through the distribution network. The micro base transceiver station modulates the base band signal and transmits the modulated base band signal to a terminal unit through an indoor antenna.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

The present disclosure describes a system that solves the problems with the prior art. The exemplary implementations disclosed herein include the incorporation of micro base stations or small base stations (uBTS) of public security (the uBTS is operated by a Public Safety agency such as a fire department, police department, etc.) into a Public Safety In-Building Wireless (PS IBW) system to provide signal coverage extension. One difference between the indoor uBTS units disclosed herein and an outdoor BTS is that the uBTS is smaller, requires lower RF output, and consumes less power. In one embodiment the MU connects to an outside BTS through a wireless link and with the uBTS through a physical link.

Figure 1:
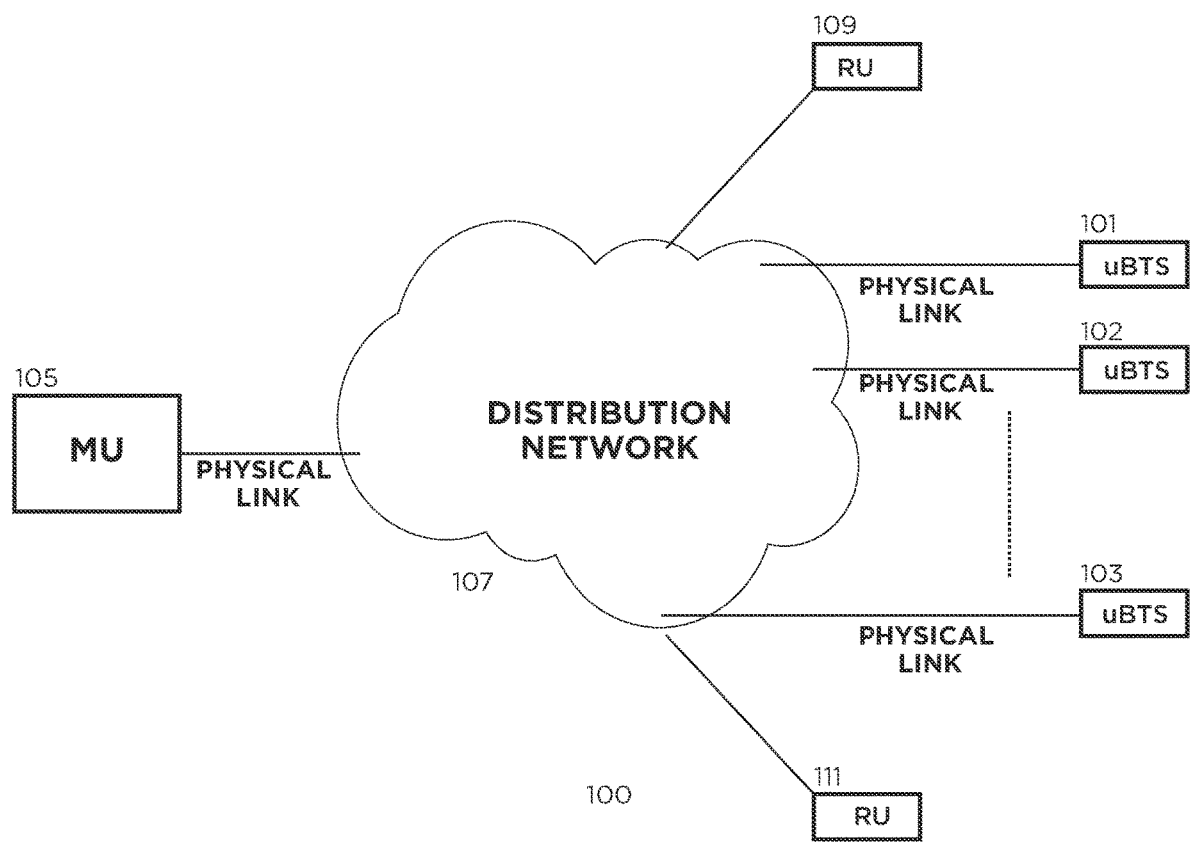
FIG. 1 illustrates a Public Safety In-Building Wireless system in accordance with one implementation of the disclosure.

Referring to FIG. 1 the IBW PS 100 may include one or more uBTS units 101-103, where each may be connected to a Master Unit (MU) 105 through a distribution network 107. The communication between the MU 105 and the uBTS units may be implemented through a physical link, for example, a structured cable, twisted pair, coaxial cable or fiber optic.

In one implementation, the uBTS units 101-103 may be implemented as transceivers that allow modulating and transmitting, and receiving and demodulating, one or many RF signals from conventional analog telecommunication systems (FM modulation), as well as digital systems such as APCO P25 phase 1, APCO P25 phase 2, DMR, TETRA, MPT1327, among others.

In one implementation, the uBTS units 101-103 connected to a MU 105 can all modulate and/or demodulate the RF signals using all the same technology/standard, such as FM modulation or digital modulations such as APCO P25, APCO P25 phase 2, DMR, TETRA, MPT1327, among others, or each uBTS can be different.

In one implementation, the uBTS units 101-103 connected to a MU 105 can all work in the same or different frequency bands and the MU 105 may communicate with the uBTS units using a TCP/IP connection or a proprietary or standardized protocol through a physical link.

Figure 4:
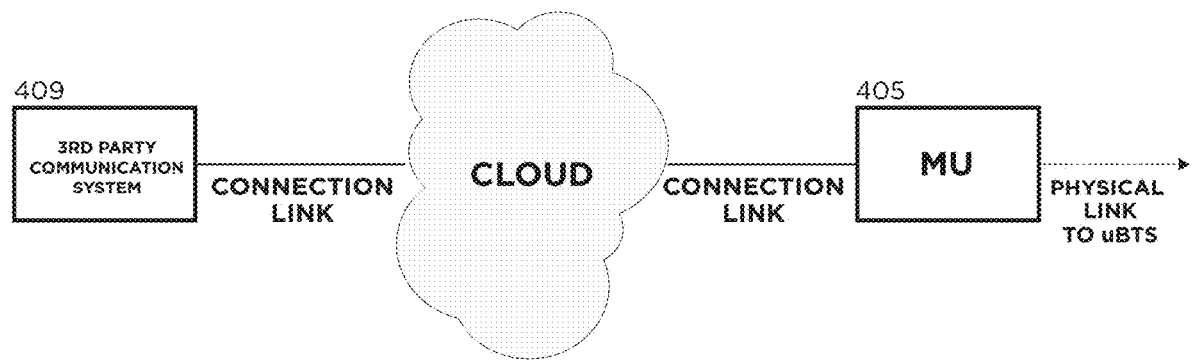
FIG. 4 illustrates an interface between a Public Safety In-Building Wireless system and third party communication system in accordance with another implementation of the disclosure.

The MU 105, which is a device in accordance with the present disclosure that also functions as part of a distributed antenna system (a DAS, illustrated as the MU 105, distribution network 107, and remote units 109 and 111), can be a stand-alone unit that coordinates the activity of the uBTS 101-103 and allows the operation of an independent network, without connection with other third networks. In one implementation, the MU 105 retransmits signals from an outdoor BTS to remote units (RUs 109 and 111) of the DAS and also transmits baseband information from PS agencies to the uBTS units and/or coordinates the operation of uBTS units 101-103 in the PS IBW system. The MU 105 may also control or coordinate the operation of the uBTS units 101-103 by receiving instructions from a third party system (FIG. 4).

Figure 2:
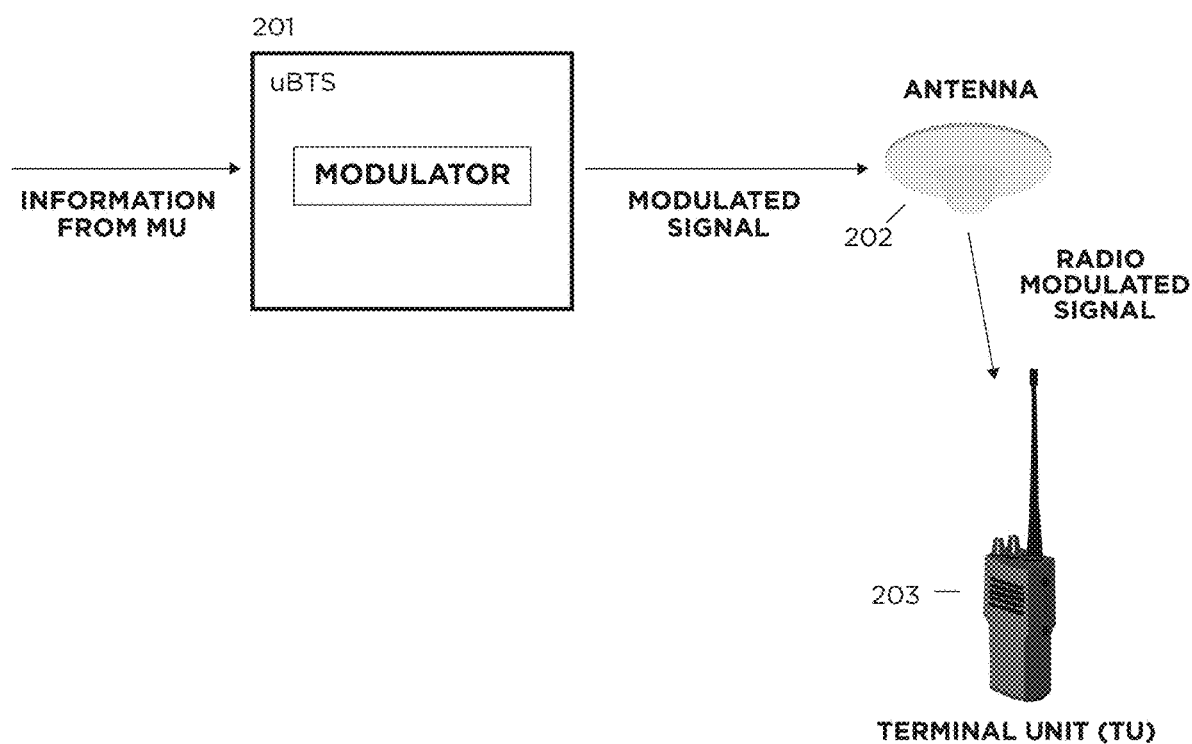
FIG. 2 illustrates a Public Safety In-Building Wireless system in accordance with another implementation of the disclosure.

Referring to FIG. 2, the uBTS units (single unit 201 being illustrated) may be implemented as active devices with the capacity to generate one or several modulated radio frequency (RF) signals (as opposed to RUs that repeat RF signals from the outdoor BTS) in one or different portions of the radio spectrum, with the objective of transmitting modulated baseband information received from the MU and originating from a PS agency towards terminal units in the PS IBW system. In the downlink direction the uBTS generated signals are then irradiated by one or several antennas 203, connected to the uBTS 201, in the direction of and with the goal of reaching the Terminal Unit (TU). The TUs may include walkie talkies, handies, or other type of radio receivers or transceivers.

In one implementation, in the uplink direction, the uBTS units receive the signals coming from the TU and demodulate the signals to recover the base band information, instead of amplifying and relaying the radiofrequency signals from the TU to the outdoor base station (via the MU) as a standard DAS does. The baseband information recovered and sent by the MU, can be received, or not, by a third party system or directly by a PS agency.

Figure 3:
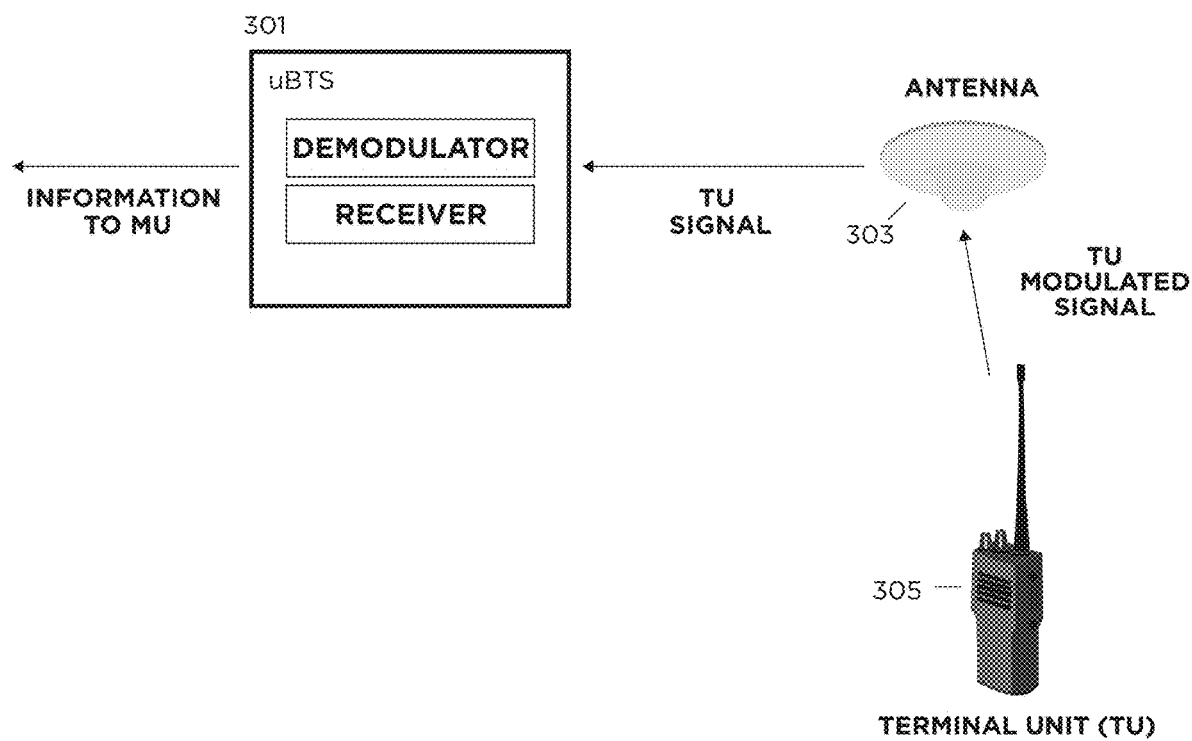
FIG. 3 illustrates a Public Safety In-Building Wireless system in accordance with another implementation of the disclosure.

Referring to FIG. 3, the uBTS 301 may be equipped with one or more RF receivers and demodulators, which receive the signal(s) that were emitted by the TUs 305 and captured by the indoor antennas 303, allowing the demodulated information of the RF signals to be sent by the uBTS 301 towards the MU.

Referring to FIG. 4, in one implementation a MU 405 may have one or more connection ports to connect to other telecommunications systems 409 through standardized protocols or proprietary protocols, through TCP/IP connections, gateways, or other interconnection methods, either to interoperate with those third-party systems, or to be able to function as part of those systems. For example, if a county operates a p25 radio system, the MU can connect to the county p25 radio system and exchange information in base band, like data or voice, and then send that information to the uBTS in the downlink direction. In the uplink direction, the MU receives the baseband signal from the uBTS that can be sent to the county p25 radio system. The uBTS can be part of the county system in terms of that system recognizing the uBTS as part of the county's BTS, and/or alternatively the uBTS together with the MU can be an independent system that is not managed by the county system but can still exchange base band information between the MU and uBTS.

In one implementation, when a MU is connected to other telecommunications systems through standardized protocols or proprietary protocols, through TCP/IP connections, gateways or other interconnection methods, the uBTS connected to that MU can modulate and/or demodulate the RF signals using the same technology/standards as the other telecommunications system, or they can be different. The MU can synchronize the operation of one or more uBTS with the objective of synchronizing the modulation and/or transmission and the reception and/or demodulation of RF.

In one implementation, the MU has the ability to calculate the signal strength of each radio signal that is received by one or more uBTSs, being able to calculate the signal strength according to the information received from each uBTS, or by asking each uBTS to transmit the intensity of received signal(s). Also, the MU has the ability to request one or more uBTS units to perform radio spectrum measurements on one or more radio spectrum portions. The measurements include detecting power per channel and detecting power within a certain number of channels (integrated power). The uBTS may also detect power per time, such as for example in TDMA systems, where the uBTS may identify the power received at a certain time and link that information with the demodulated baseband information from which the uBTS can recover the TU information, thus linking the received power level, the precise time that it was received and the TU information.

The MU has the ability to use one or more uBTS as a radio interface to connect to other Base Stations of other public safety systems (e.g., county, police department, fire department, etc.), receiving information from those other systems through one or more uBTS units, and to use that information for managing, controlling or communicating with the rest of the uBTS units in the PS IBW system. The uBTS may be part of a larger system, e.g., a county's p25 system, or it can be part of an independent system. In the scenario where the uBTS is part of a larger system, then in one implementation the uBTS may broadcast the same signals than the larger system's outdoor BTS broadcasts (e.g., county's p25 BTSs) and would therefore replicate the operation of the outdoor BTS of the larger system.

In one implementation, the MU and/or uBTS are devices that have the ability to provide operation alarms through dry contacts, such as: system status alarm, VSWR alarms on their antennas, donor antenna alarm in the event that one or more uBTS are operating as a radio interface with other telecommunications systems, power supply alarm, or battery backup system alarm. Also, the MU and/or the uBTS may include circuitry that allows the reading of dry contacts and alarm outputs of other devices. The MU and/or the uBTS may be equipped with cabinets that meet at least the NEMA4 standard.

Figure 5:
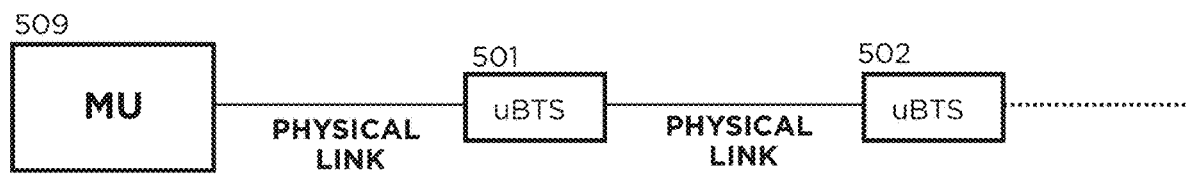
FIG. 5 illustrates a configuration for connection of microBTS units with Master Units in accordance with one implementation of the present disclosure.

Referring to FIG. 5, the MU 505 may be connected to two or more uBTS units 501-502 on a daisy chain configuration.

Figure 6:
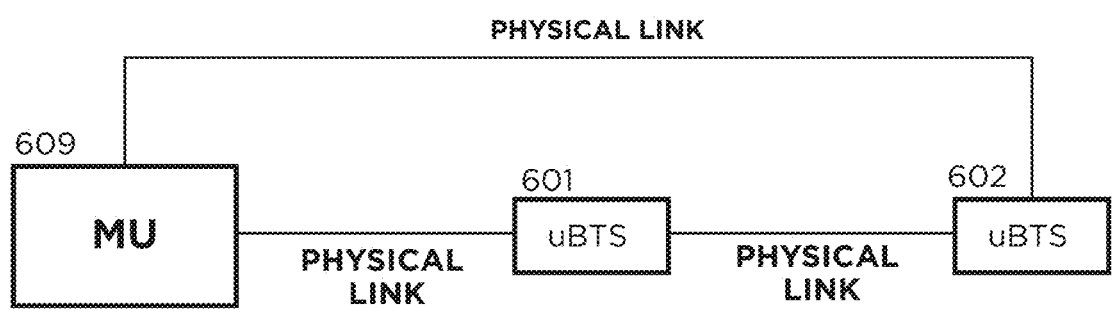
FIG. 6 illustrates a configuration for connection of microBTS units with Master Units in accordance with another implementation of the present disclosure.

Referring to FIG. 6, the MU 605 may be connected to two or more uBTS units 601-602 on a closed loop daisy chain configuration.

In one implementation, the uBTS has the capability to measure the precise time in which its receives a certain signal, can measure the received signal power and can obtain the TU information by demodulating the received signal from the TU. By having uBTSs gather that information and providing it to the MU, the MU collects the received information from all the uBTSs and compares the difference in time and in power of the same signal received by the different uBTSs from the same TU, and by performing triangulation the MU can determine the physical location of the TU.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means-plus-function format and are not intended to be interpreted based on 35 U.S.C. 112(f), unless and until such claim limitations expressly use the phrase "means for" followed by a statement of function void of further structure.

The invention claimed is:

1. A distributed antenna system for providing extended signal coverage within an indoor area comprising:
   a master unit;
   a remote unit;
   a micro base transceiver station;
   an indoor antenna;
   a distribution network; and
   a terminal unit;
   wherein the master unit receives a first modulated signal from an outdoor base transceiver station, and relays the modulated signal to said remote unit through the distribution network;
   wherein the master unit receives a base band signal originating outside said indoor area, and transmits the baseband signal to the micro base transceiver station through the distribution network;
   wherein the micro base transceiver station modulates the base band signal and transmits the modulated base band signal to said terminal unit through the indoor antenna; and
   wherein the micro base transceiver station is located within said indoor area and has a lower RF output than an RF output of the outdoor base transceiver station.

2. The system of claim 1, wherein the micro base transceiver station receives a signal from the terminal unit and perform spectral measurements on said signal from the terminal unit.

3. The system of claim 2, wherein said spectral measurements include power per channel, integrated power, or power per time.

4. The system of claim 1, wherein the micro base transceiver station generates locally public safety signals within the indoor area.

5. The system of claim 1, further comprising a second micro base transceiver station connected to the master unit through the distribution network.

6. The system of claim 5, wherein the first and second micro base transceiver stations receive a signal from the terminal unit, and based on said signal received by the first and second micro base transceiver stations, the master unit calculates the location of the terminal unit.

7. The system of claim 1, further comprising a second micro base transceiver station, wherein the master unit and the first and second micro base transceiver stations are connected in a daisy chain configuration.

8. The system of claim 1, further comprising a second micro base transceiver station, wherein the master unit and the first and second micro base transceiver stations are connected in a closed loop daisy chain configuration.

* * * * *